(12) United States Patent
Derks et al.

(10) Patent No.: US 6,925,092 B1
(45) Date of Patent: Aug. 2, 2005

(54) COMMUNICATIONS SYSTEM AND COMMUNICATION METHOD FOR DATA MULTIPLEXING

(75) Inventors: Frank P. Derks, Hilversum (NL); Jeroen G. Van Velden, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 722 days.

(21) Appl. No.: 09/689,061

(22) Filed: Oct. 12, 2000

(30) Foreign Application Priority Data

Oct. 21, 1999 (EP) .................................. 99203453

(51) Int. Cl.[7] .............................. H04J 3/22; H04L 12/28
(52) U.S. Cl. ...................... 370/465; 370/474; 348/467
(58) Field of Search ................................ 370/473, 474, 370/477, 470, 471, 537, 401, 465, 476; 348/461, 348/465, 467

(56) References Cited

U.S. PATENT DOCUMENTS 5,550,593 A * 8/1996 Nakabayashi ................ 348/465
6,134,383 A * 10/2000 Kikuchi et al. ............... 386/95
6,594,276 B1 * 7/2003 Le .............................. 370/465

OTHER PUBLICATIONS

Simpson et al., RFC 1661, The Point-to-point Protocol (PPP), Jul., 1994.*
Schulzrinne et al., RFC 1889, RTP: A Transport Protocol for Real-Time Applications, Jan., 1996.*
By J. Rosenberg, H. Schulzrinne: Entiled Issues and Options for RTP Multiplexing, Internet Engineering Task Force (IETF) , Oct. 1, 1998, pp. 1-27.

* cited by examiner

*Primary Examiner*—Afsar Qureshi
(74) *Attorney, Agent, or Firm*—Jack D. Slobod

(57) ABSTRACT

A communication station and communication method for effectively multiplexing data into a combined data stream by adding a special header to the combined data packet. The bit positions of this special header indicate the presence of data packets in a data stream in a combined data packer. The combined data packet is transmitted from the first to the second communication station through a first communication channel. Changes in the data streams can be communicated to the receiving communication station through a second communication channel, so that the second communication station can restore relations between data streams and recreate stripped headers.

20 Claims, 6 Drawing Sheets

COMMUNICATIONS SYSTEM AND COMMUNICATION METHOD FOR DATA MULTIPLEXING

The invention relates to a communications system comprising a first communication station arranged for multiplexing original data packets coming from one or more original data streams in a combined data packet in a combined data stream and for transmitting the combined data stream and means for transmitting the combined data stream from the first communication station to the second communication station through a channel, and a second communication station arranged for receiving the combined data stream and demultiplexing the original data packets in the combined data packet.

The invention likewise relates to a communication station and a communication method.

Such a system is known from "Multiplexing scheme for RTP flows between access routers" by K. El-Khatib et al, 24 Jun. 1999, Internet Engineering Task Force. This document describes an approach to the multiplexing of RTP data streams for which the use of the transmission channel is reduced by replacing the header of each original data packet by a stripped header determined on the basis of a table. The data packet together with the stripped header is included in a combined data packet and transmitted by the first communication station to the second communication station. After the data packet has been extracted from the combined data packet, the receiving communication station can regenerate the original header of the original data packet on the basis of the stripped header and with the aid of a table. The stripped header is replaced by the original header after which the original data packets is available again. Each data packet is still to contain a stripped header on the basis of which the data packet in the combined data stream can be identified, so that with the described system it is not very well possible to include the original data packets in the combined data stream in an efficient manner and thus efficiently utilize the transmission channel.

It is an object of the invention to enable to include the original data packets in the combined data stream more efficiently.

For this purpose, the system according to the invention is characterized in that the combined data packet includes a header field which is arranged for indicating the presence of data packets of the original data streams in the combined data packet.

The header field in the combined data packet indicates the presence of a data packet from the original data stream in the combined data packet, so that the second communication station can generate the appropriate headers and add them again to the original data packet.

The invention is based on the following recognition.

When data streams which have a common origin and destination are multiplexed and demultiplexed, the header information of each data packet is included in the combined data stream. An RTP packet which is transmitted, for example, with the aid of an IP protocol, contains in addition to the data an RTP header, a UDP header and an IP header. This overhead results in an inefficient use of the transmission channel. The use of a header field in the combined data packet enables, when a data stream is fixedly assigned to a position in the combined data packet, to indicate by means of a bit whether data belonging to a certain data stream is available in the combined packet. A 1, for example, indicates the presence, whereas a 0 indicates the absence of a data packet belonging to the respective data stream. Since the absence of a data packet is known, the corresponding position in the combined data stream need not be padded with padding data, but the packet can be omitted, and the data packets that are present indeed in the data streams whose position in the combined data packet are normally before and after the respective position can be closed up. As a result, the combined data packet is stripped, so that the transmission channel is utilized more efficiently.

An attendant advantage is that, when original data packets are lacking, the communications system according to the invention need not transmit empty data packets, so that a further optimization of the use of the transmission channel is obtained.

An embodiment of the invention is characterized in that the communications system comprises means for giving information about the structure of the combined data packets in the combined data stream by a further channel.

In this embodiment, the information about the structure of the combined data packets is rendered available to the receiver by a separate transmission channel in order to enable a more flexible format of the available positions. Based hereon, the second communication station can re-generate the headers removed by the first communication station and add them again to the original data packets. Since the headers of the data packets coming from the same data stream may show a large redundancy, only the changes in the headers are passed on to the receiver, which results in a minimum use of the transmission channel.

Consequently, it is possible to adjust the contents of the combined data packet to modified circumstances, for example, the omission of an original data stream, or a modification of the amount of data offered in an original data stream.

Also the contents of the removed headers are no longer a limiting factor, and different protocols and a larger number of end stations can be supported.

A further embodiment is characterized in that a bit from the header field is arranged for indicating the presence of a next header field.

The number of data streams that can be combined in the combined data packet is in this invention limited to the number of available bits that indicate the presence of data packets in the header of the combined data packet. If this header field contained eight bits, a maximum of eight data streams could be included in the combined packet. This limitation is removed by the use of a special bit in the header field which indicates the presence of a next extra header field. As a result, the number of data streams may be extended at will, whereas with a given number of data streams only a limited number of bits are co-transmitted without being used. The number of bits in the header field of the combined data packet is thus adapted to the number of data streams to be combined.

A further embodiment is characterized in that the information about the structure of the combined data packets comprises a time indication for the original data stream.

In some data streams the mutual relation with time is important as is the case, for example, with the transmission of two separate data streams of video signals and the associated audio signals.

Some data streams also contain a time indication in the headers of the data packets.

Since this relation or information is lost during the combining to a combined packet, a separate transmission channel has been provided for transmitting a time indication of the data stream concerned. This provides that the receiver can re-establish the mutual relation with time, or the time indication in the headers.

The invention will be further explained with reference to the drawings wherein:

FIG. 1 gives a survey of a communications system in which different original data streams coming from different sources are combined to a combined data stream;

The invention will now be described with reference to a communications system in which RTP data packets are transmitted according to the UDP protocol and the IP protocol.

An end station may in all Figures be the source or the destination of a plurality of data streams.

Figure 1:
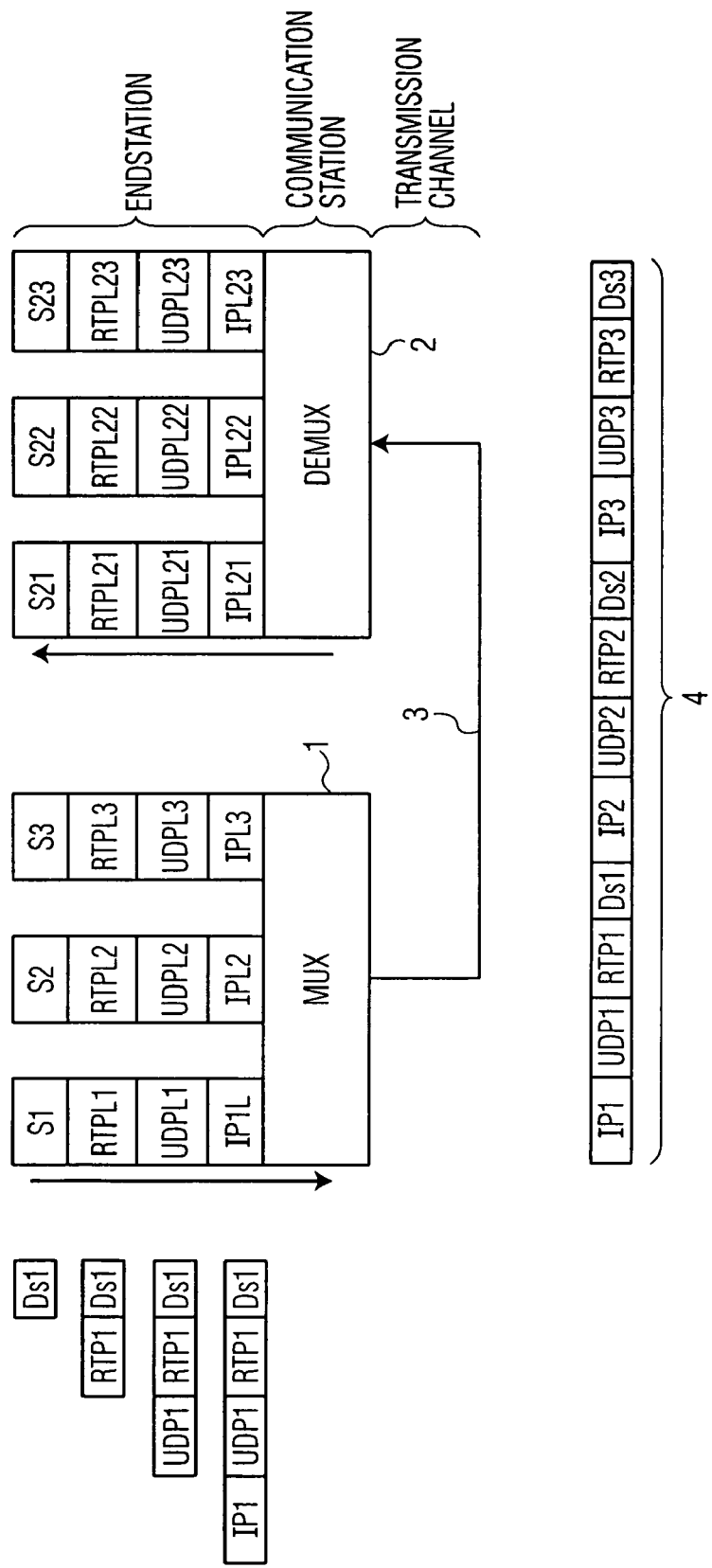

FIG. 1 shows a layer model of an implementation of a state-of-the-art communications system.

A data packet Ds1 coming from an end station S1, which is sent to end station S21 is provided with, in succession, an RTP header RTP1 by an RTP layer RTPL1, a UDP header UDP1 by a UDP layer UDPL1, and an IP header IP1 by an IP layer IPL1, after which the data packet together with other data packets Ds2 and Ds3 coming from the end stations S2 and S3 and also provided with an RTP/UDP/IP header is included in a combined data stream 4 by means of a multiplexer 1 of the first communication station. When RTP data packets are transmitted in this fashion, an unnecessarily large demand is made on the transmission capacity of the transmission channel 3.

On the receiving side, the data packets Ds1, Ds2 and Ds3, including the associated RTP/UDP/IP headers are extracted from the combined data stream 4 by the demultiplexer of the second communication station 2. Subsequently, the IP header IP1 is removed by the IP layer IPL21, the UDP header UDP1 is removed by the UDP layer UDP21 and the RTP header RTP1 is removed by the RTP layer RTP21, after which the data Ds1 is meant for end station S21.

Figure 2:
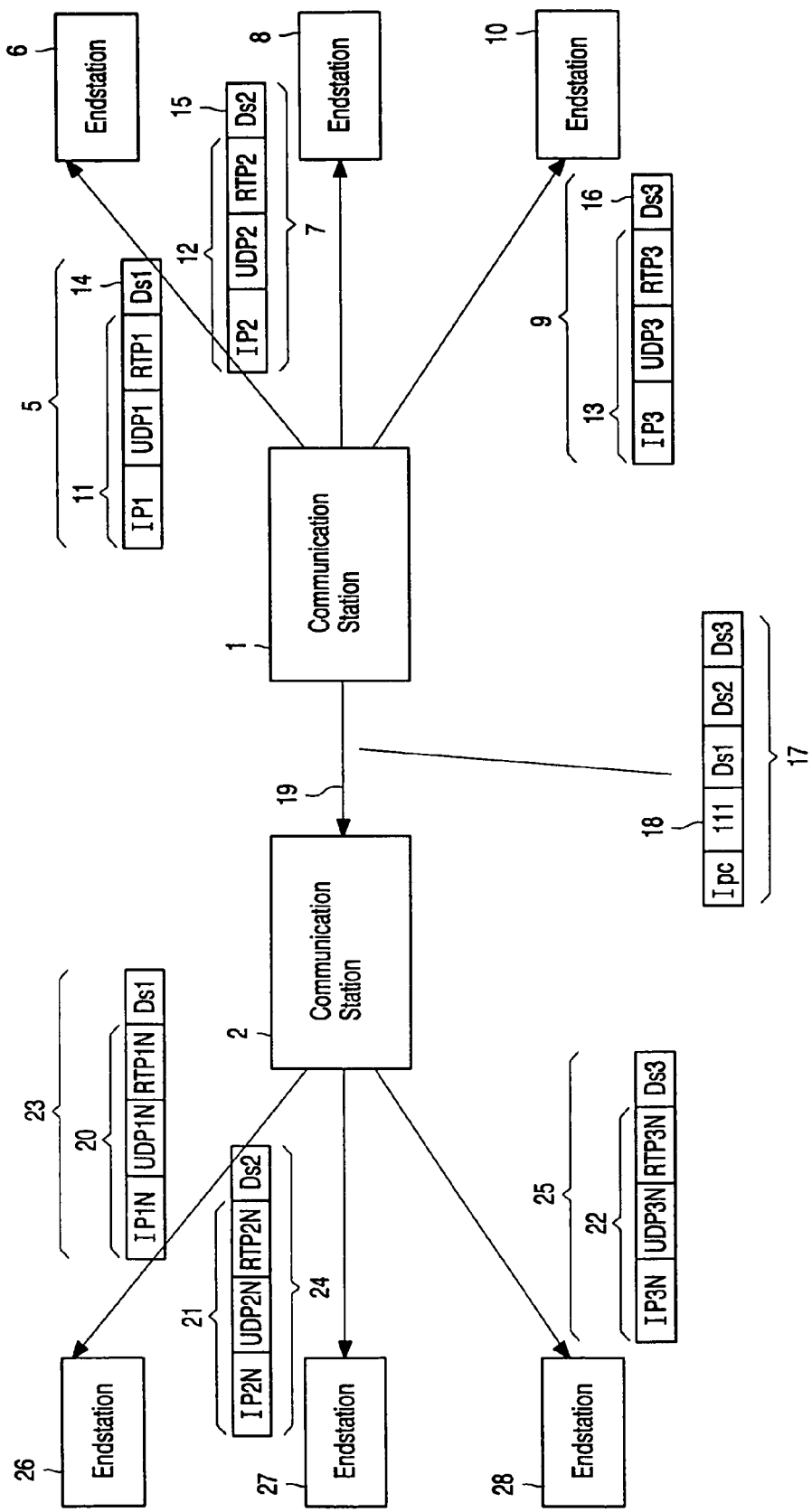
FIG. 2 shows the structure of an original data packet coming from an original data stream.

FIG. 2 diagrammatically shows a communications system according to the invention in which different original data streams coming from different sources are combined to a combined data stream. The communications system comprises a first communication station 1 to which are sent a plurality of original data packets 5, 7 and 9 coming from the original data streams from various end stations 6, 8 and 10. The original data packets 5, 7 and 9 contain headers 11, 12 and 13 in which different aspects of the original data stream are laid down. The first communication station 1 removes the headers 11, 12 and 13 and inserts the data 14, 15 and 16 of the original data packets 5, 7 and 9 at an agreed location in the combined data packet 17 and adds a header 18 which indicates the presence of the data of an original data stream 5, 7 and 9 in the combined data packet 17. Subsequently, the communication station 1 sends the combined data packet 17 through transmission channel 19 to a second communication station 2. The second communication station 2 receives the combined data packet 17 and extracts the data 14, 15 and 16 from the original data packets 5, 7 and 9 from the combined data packet 17 on the basis of the information obtained from the header 18. The new headers 20, 21 and 22 are reconstructed and added to the data 14, 15 and 16 extracted from the combined data packet, so that again new data packets 23, 24 and 25 evolve which are identical with the original data packets 5, 7 and 9. These new data packets 23, 24 and 25 are then transmitted to the end stations 26, 27 and 28.

Figure 3:
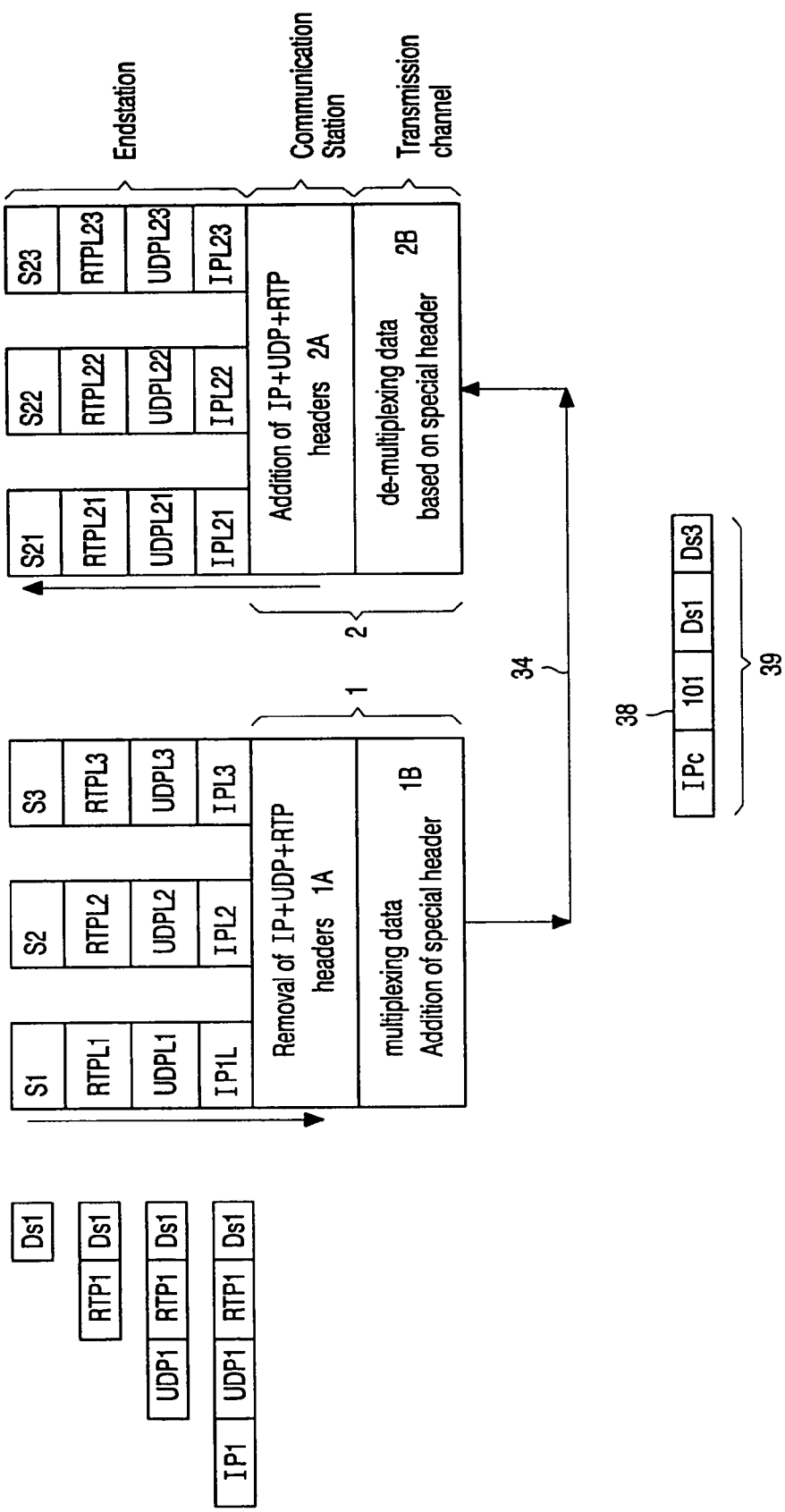
FIG. 3 shows the structure of a combined data packet.

FIG. 3 shows the layer model of the communications system according to the invention.

A data packet Ds1 coming from an end station S1 is extended by, in succession, an RTP header RTP1, a UDP header UDP1, and an IP header IP1 after which the packet is transmitted to the first communication station 1. In the first portion 1A of the first communication station 1, the IP, UDP and RTP headers IP1, UDP1 and RTP1 are removed. A second portion 1B of the first communication station inserts the data packet Ds1 that remains after this operation together with the other data packets at the position assigned to each data stream in the combined data packet 39. A special header 38 and an IP header IPc 36 are furthermore added to the combined data packet 39. By means of a bit the special header 38 indicates the presence of a data packet from the original data stream belonging to this position. In the example of FIG. 3, the contents of the special header 38 are "101", which indicates that only the data packets Ds1 and Ds3 coming from the original data streams of end station S1 and end station S3 are present in the combined data packet 39. Since the absence of a data packet coming from the data stream of end station S2 is indicated by the logic "0" at the respective position of the special header 38, the corresponding position in the combined data stream may be omitted. Consequently, in the combined data packet 39 the data packet Ds3 directly connects to the data packet Ds1 and provides an efficient transmission through transmission channel 34. On the receive side, a first portion 2B of the second communication station 2 extracts the data packets Ds1 and Ds3 from the combined data stream and a second portion 2A of the second communication station provides the data packets Ds1 and Ds3 with the correct RTP/UDP/IP headers and transmits them to the respective end station. In the layer model the IP header IP1, the UDP header UDP1 and, subsequently, the RTP header RTP1 are removed after which the data packet Ds1 remains.

Figure 4:
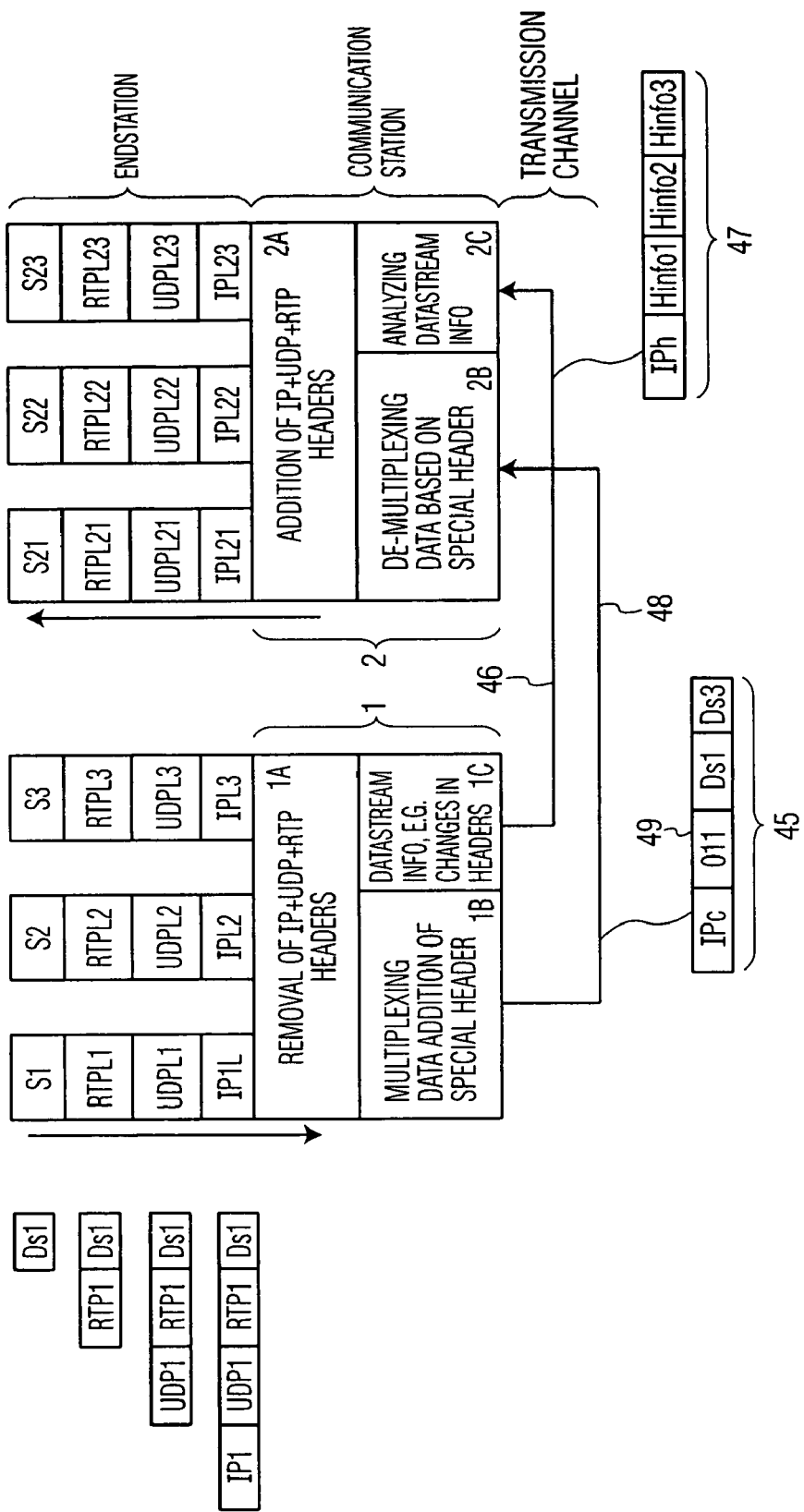
FIG. 4 shows the structure of a combined data packet and the use of a second communication channel.

FIG. 4 shows the layer model of a further embodiment of the communications system according to the invention. A data packet Ds1 coming from an end station S1 is, in succession, provided with an RTP header RTP1, a UDP header UDP1 and an IP header IP1 after which the packet is transmitted to the first communication station 1. In a first portion 1A of the first communication station 1 the IP, UDP and RTP headers IP1, UDP1 and RTP1 are removed. A second portion 1B of the first communication station inserts the data packet Ds1 that remains after this operation together with other data packets, at the position assigned to each data stream in the combined data packet 45. The combined data packets 45 are transmitted to the second communication station 2 through transmission channel 48. The removed IP, UDP and RTP headers are analyzed by a third portion 1C of the first communication station 1 and the changes Hinfo1, Hinfo2 and Hinfo3 which are important to the original data streams are passed on to the receiving second communication station 2 via a separate signaling packet 47 through a channel 46, so that a third portion 2c of the receiving second communication station 2 can re-generate the correct IP/UDP/RTP headers of the incoming data packets on the basis of this information. A first portion 2A of the second communication station 2 extends the incoming data packets by these headers which data packets are extracted from the combined data stream 45 by a second portion 2B of the second communication station. This offers the possibility of adjusting the contents of the combined data packets 45 to the circumstances, while still an efficient transmission is obtained, since no empty data packets in this example Ds1 are transmitted. In addition, only the changes in the IP, UDP and RTP headers are passed on to the second communication station 2.

A second portion 1B of the first communication station 1 extends the combined data packet 45 by a special header 49 and an IP header IPc. The special header 49 indicates by means of a bit the presence of a data packet from the original data stream belonging to this position. In the example of FIG. 4, the contents of the header 49 are "011", which indicates that only the data packets S2 and S3 coming from the original data streams of end station S2 and end station S3 are present in the combined data packet 45. Since the absence of a data packet Ds1 coming from the data stream of end station 1 is indicated by means of a special header 49, the corresponding position in the combined data stream 45 may be omitted. As a result, the data packet Ds2 directly connects to the special header 49 and an efficient transmission is obtained.

Figure 5:
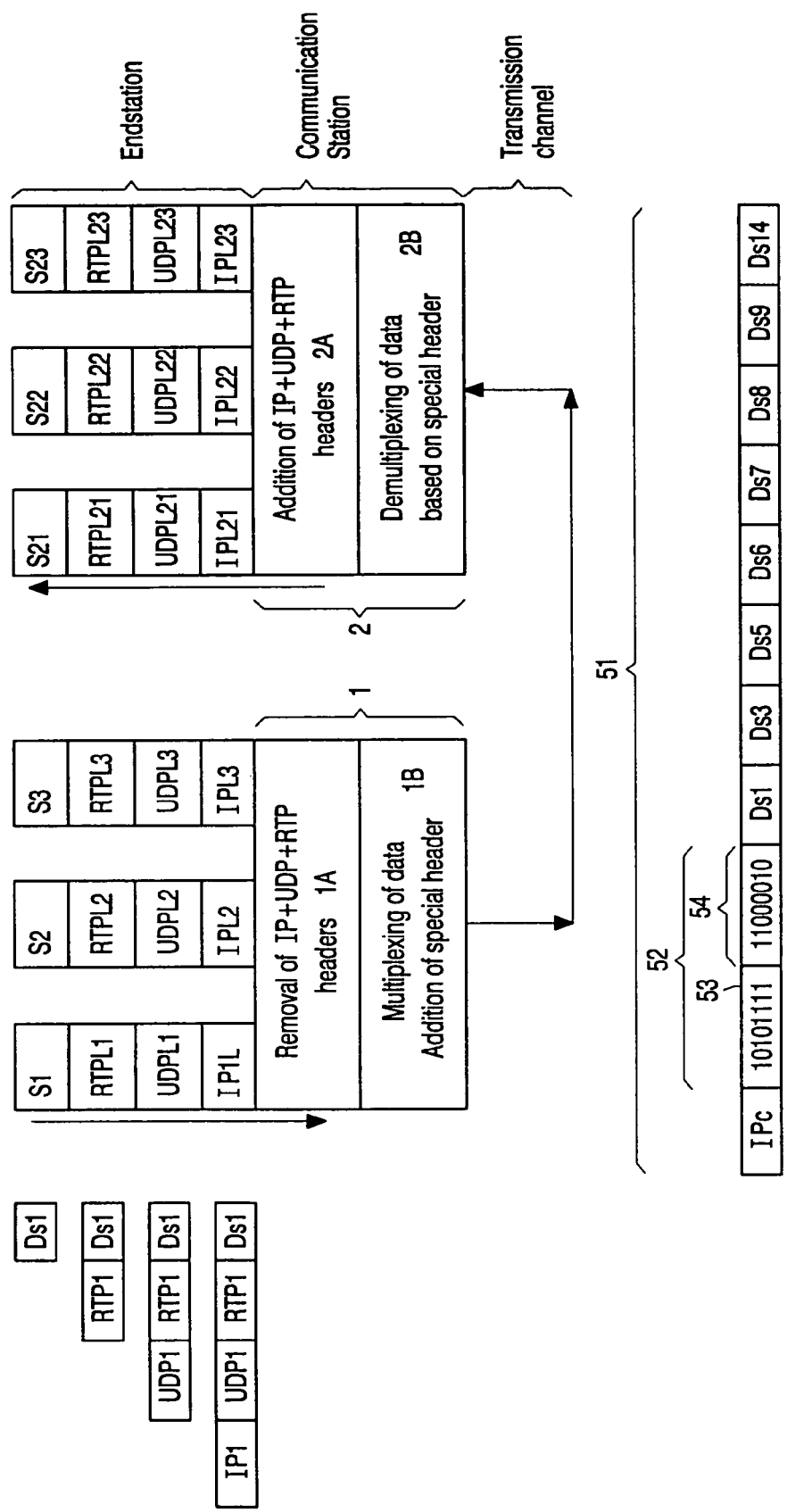
FIG. 5 shows the transmission of a combined data packet and a packet containing information about the contents of the combined data packet.

FIG. 5 shows a structure of a combined data packet for which use is made of the extension bit according to the invention. A data packet Ds 1 coming from an end station S1 is extended by, in succession, an RTP header RTP1, a UDP header UDP1 and an IP header IP1, after which the packet is transmitted to the first communication station 1. Here the IP, UDP and RTP headers are removed by a first portion 1A of the first communication station 1 and the remaining data packet Ds1 together with other data packets, in this example Ds3, Ds5, Ds6, Ds7, Ds8, Ds9 and Ds 14 are inserted at the position in the combined data packet 51 by the second portion 1B of the first communication station assigned to each data stream. The second portion 1B of the first communication station 1 extends the combined data packet 51 by a special header 52 and an IP header IPc. The special header indicates by means of a bit the presence of the data packet from the original data stream belonging to this position.

The special header 52 additionally contains an extension bit 53 which indicates the presence of an additional special header 54. A logic "1" indicates the presence of an additional special header 54, whereas a logic "0" indicates that no additional special header 54 will follow. By means of the additional special header 54, the number of data streams to be processed separately may be extended variably, since the number of available bit positions, by which the presence of a data packet from the original data stream belonging to this position is indicated, is extended. In the example of FIG. 5, the contents of the first special header 52 are '10101111', in which the first seven bits indicate that only the data packets Ds1, Ds3, Ds5, Ds6 and Ds7 come from the original data streams of the end stations S1, S3, S5, S6 and S7 in the combined data packet 52 are present, and the eighth bit, the extension bit 53, indicates that an additional (in this case second) special header 54 will follow. The additional special header 54 in the example of FIG. 5 has the contents '11000010' in which the first seven bits indicate that only the data packets Ds8, Ds9 and Ds14 coming from the end stations S8, S9 and S14 are present in the combined data packet 51, and the eighth bit, the extension bit 53 indicates that no additional (in this case third) special header will follow. The use of the extension bit 53 in the example of FIG. 5 makes the number of simultaneously supportable data streams rise from 8 to 14. Any desired number of original data streams can be supported by a recurrent use of the extension bit 53 in the special header. Since the absence of the data packets Ds2, Ds4, Ds10, Ds11, Ds12 and Ds13 coming from the data streams of end stations S2, S4, S10, S11, S12 and S13 are indicated by means of the special headers, the corresponding positions in the combined data stream 51 may be omitted.

Figure 6:
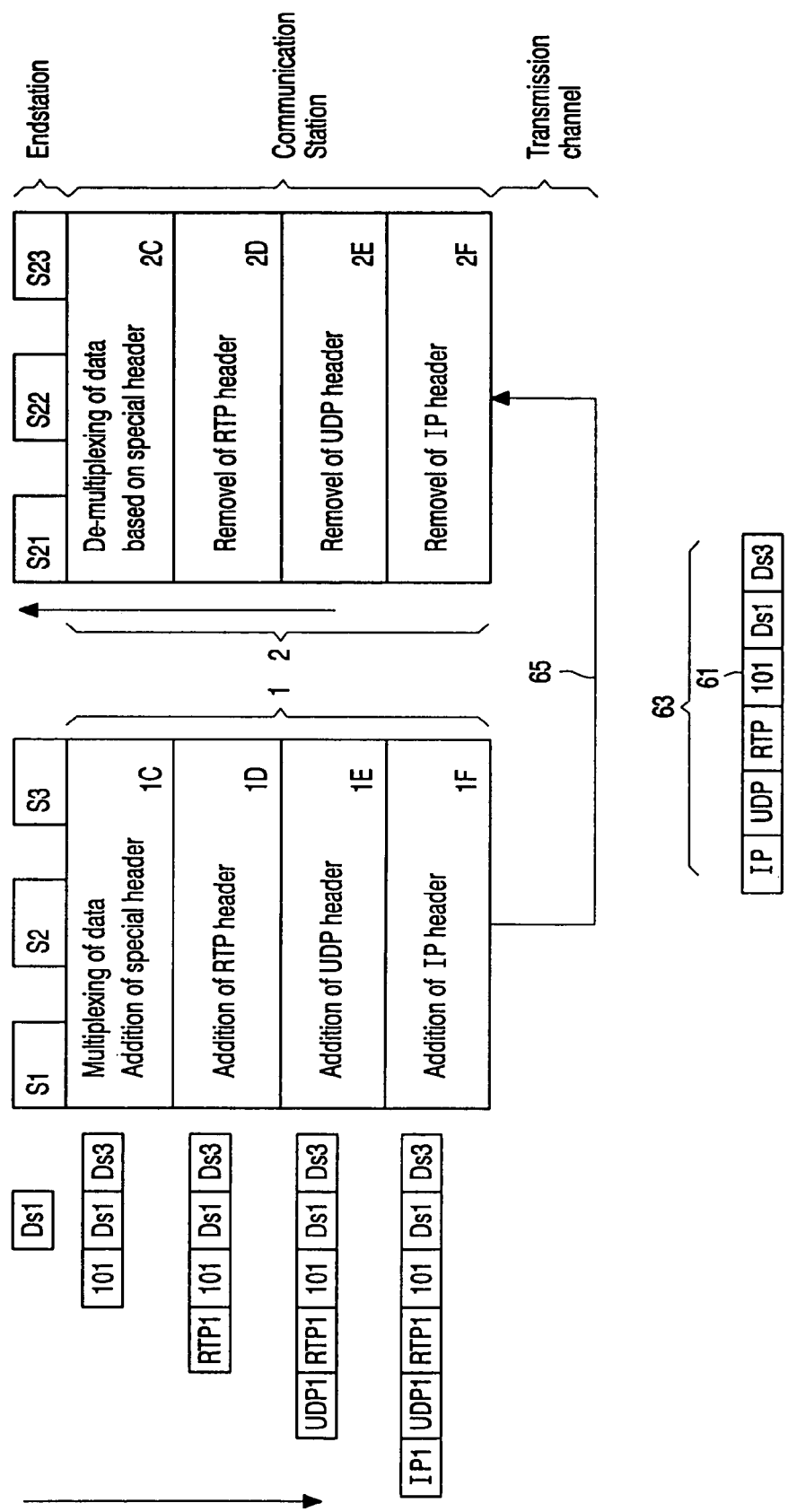
FIG. 6 shows a structure of a combined data packet in which the extension bit in the header field of the combined data packet is used.

FIG. 6 shows the layer model of a further embodiment of the communications system according to the invention. A data packet Ds1 coming from an end station S1 is passed on to the first communication station 1. A first portion 1C of the first communication station puts the data packet Ds1, as it does other data packets, on the position of the combined data packet 63 assigned to each data stream. The combined data packet 63 is additionally extended by a special header 61. The special header 61 indicates by means of a bit the presence of a data packet from the original data stream belonging to this position. In the example of FIG. 6 the contents of the special header 61 are '101', which indicates that only the data packets Ds1 and Ds3 coming from the original data streams of end station S1 and end station S3 are present in the combined data packet 63. Since the absence of a data packet coming from the data stream of end station S2 is indicated by means of a logic "0" on the respective position of the special header 61, the corresponding position in the combined data stream may be omitted. As a result, the data packet Ds3 in the combined data packet 63 directly links with the data packet Ds1. In a second portion 1D of the first communication station 1, an RTP header RTP1 is extended to the combined data packet 63. In a third portion 1E of the first communication station 1, a UDP header UDP1 is extended to the combined data packet 63. In a fourth portion 1F of the first communication station 1 an IP header IP1 is then extended to the combined data packet 63. This combined data packet 63, including the headers IP1, UDP1 and RTP1 is transmitted to a second communication station 2 by the first communication station 1 over a transmission channel 65 at which second communication station, in succession, a first portion 2F removes the IP header IP1, a second portion 2E removes the UDP header UDP1, and a third portion 2D removes the IP header IP1. In a fourth portion 2C of the second communication station the data packet Ds1 is subsequently recovered from the remaining combined data packet 63 on the basis of the special header, and transmitted to the respective end station.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A communications system, comprising:
   a first communication station operable to receive a first data stream including a first data packet from a first end station and to receive a second data stream including a second data packet from a second end station,
      wherein, in response to receiving the first data stream from the first end station and failing to receive the second data stream from the second end station, the first communication station is further operable to multiplex the first data packet in a combined data packet, and
      wherein the combined data packet includes a first header field indicative of a presence of the first data packet in the combined data packet and indicative of an absence of the second data packet from the combined data packet; and
   a second communication station operable to demultiplex the first data packet in the combined data packet based on the first header field; and a first channel for transmitting the combined data packet from the first communication station to the second communication station.

2. The communication system of claim 1,
wherein the first communication station is further operable to receive a third data stream including a third data packet from a third end station;
wherein, in response to receiving the third data stream from the third end station, the first communication station is further operable to multiplex the third data packet in the combined data packet;
wherein the first header field indicates a presence of the third data packet in the combined data packet; and
wherein the second communication station is further operable to demultiplex the first data packet and the third data packet in the combined data packet based on the first header field.

3. The communication system of claim 1,
wherein the first communication station is further operable to receive a third data stream including a third data packet from a third end station; and
wherein, in response to failing to receive the third data stream from the third end station, the first header field indicates an absence of the third data packet from the combined data packet.

4. The communication system of claim 1,
wherein the first communication station is further operable to receive a third data stream including a third data packet from a third end station;
wherein, in response to receiving the third data stream from the third end station, the first communication station is further operable to multiplex the third data packet in the combined data packet;
wherein the combined data packet further includes a second header field indicative of a presence of the third data packet in the combined data packet; and
wherein the second communication station is further operable to demultiplex the first data packet and the third data packet in the combined data packet based on the first header field and the second header field.

5. The communication system of claim 4, wherein the first header field is indicative of a presence of the second header field in the combined data packet.

6. The communication system of claim 1,
wherein the first communication station is further operable to receive a third data stream including a third data packet from a third end station;
wherein, in response to failing to receive the third data stream from the third end station, the combined data packet further includes a second header field indicative of an absence of the third data packet from the combined data packet.

7. The communication system of claim 6, wherein the first header field is indicative of a presence of the second header field in the combined data packet.

8. The communication system of claim 1, wherein the combined data packet further includes at least one of a RTP header, a UDP header and a IP header.

9. The communication system of claim 1,
wherein the first data stream further includes at least one of a RTP header, a UDP header and a IP header; and
wherein the first communication station is further operable to generate a signaling packet indicative of an analysis of at least one of the RTP header, the UDP header and the IP header.

10. The communication system of claim 9, further comprising:
a second channel for transmitting the signaling packet from the first communication station to the second communication station.

11. A first communication station, comprising:
means for receiving a first data stream including a first data packet from a first end station and to receive a second data stream including a second data packet from a second end station,
wherein, in response to receiving the first data stream from the first end station and failing to receive the second data stream from the second end station, the first data packet is multiplexed in a combined data packet; and
wherein the combined data packet includes a first header field indicative of a presence of the first data packet in the combined data packet and indicative of an absence of the second data packet from the combined data packet; and
means for transmitting the combined data packet along a first channel to a second communication station.

12. The first communication station of claim 11, further comprising:
means for receiving a third data stream including a third data packet from a third end station,
wherein, in response to receiving the third data stream from the third end station, the third data packet is multiplexed in the combined data packet, and
wherein the first header field indicates a presence of the third data packet in the combined data packet.

13. The first communication station of claim 11, further comprising:
means for receiving a third data stream including a third data packet from a third end station,
wherein, in response to failing to receive the third data stream from the third end station, the first header field indicates an absence of the third data packet from the combined data packet.

14. The first communication station of claim 11, farther comprising:
means for receiving a third data stream including a third data packet from a third end station,
wherein, in response to receiving the third data stream from the third end station, the third data packet is multiplexed in the combined data packet, and
wherein the combined data packer farther includes a second header field indicative of a presence of the third data packet in the combined data packet.

15. The first communication station of claim 14, wherein the first header field is indicative of a presence of die second header field in the combined data packet.

16. The first communication station of claim 11, further comprising:
means for receiving a third data stream including a third data packet from a third end station,
wherein, in response to failing to receive the third data stream from the third end station, the combined data packet further includes a second header field indicative of an absence of the third data packet from the combined data packet.

17. The first communication station of claim 11, wherein the first header field is indicative of a presence of the second header field in the combined data packet.

18. The first communication station of claim 11, wherein the combined data packet further includes at least one of a RTP header, a UDP header and a IP header.

19. The first communication station of claim 11, further comprising:
   means for generating a signaling packet indicative of an analysis of at least one of a RTP header, a UDP header and a IP header included within the first data stream, and
   means for transmitting the signaling packet along a second channel to the second communication station.

20. A communication station, comprising:
   means for receiving a combined data stream including at least one header field indicative of a presence in the combined data stream of a first data packet from a first end station in the combined data stream and indicative of an absence from the combined data stream of a second data packet from a second end station; and
   means for demultiplexing the first data packet based on the at least one header field.

* * * * *